United States Patent
Alakuijala et al.

(10) Patent No.: US 12,236,554 B2
(45) Date of Patent: Feb. 25, 2025

(54) ADAPTIVE QUANTIZATION AND DEAD ZONE MODULATION

(71) Applicant: GOOGLE LLC, Mountain View, CA (US)

(72) Inventors: Jyrki Alakuijala, Mountain View, CA (US); Luca Versari, Mountain View, CA (US)

(73) Assignee: Google LLC, Mountain View, CA (US)

( * ) Notice: Subject to any disclaimer, the term of this patent is extended or adjusted under 35 U.S.C. 154(b) by 432 days.

(21) Appl. No.: 17/766,897

(22) PCT Filed: Oct. 14, 2019

(86) PCT No.: PCT/US2019/056049
§ 371 (c)(1),
(2) Date: Apr. 6, 2022

(87) PCT Pub. No.: WO2021/076091
PCT Pub. Date: Apr. 22, 2021

(65) Prior Publication Data
US 2023/0147376 A1    May 11, 2023

(51) Int. Cl.
*G06V 10/00*    (2022.01)
*G06T 3/40*    (2006.01)
*G06T 9/00*    (2006.01)

(52) U.S. Cl.
CPC . *G06T 3/40* (2013.01); *G06T 9/00* (2013.01)

(58) Field of Classification Search
CPC .... H04N 19/124; H04N 19/126; H04N 19/18; H04N 19/154; H04N 19/625; H04N 19/184; G06T 3/40; G06T 9/00
See application file for complete search history.

(56) References Cited

U.S. PATENT DOCUMENTS

| | | | | |
|---|---|---|---|---|
| 4,894,713 A | * | 1/1990 | Delogne | H04N 19/619 |
| | | | | 375/E7.14 |
| 5,262,854 A | * | 11/1993 | Ng | H04N 19/59 |
| | | | | 375/E7.242 |

(Continued)

FOREIGN PATENT DOCUMENTS

EP    1 675 405    6/2006

OTHER PUBLICATIONS

Wikipedia, Quantization (signal processing), https://en.wikipedia.org/wiki/Quantization_(signal_processing)#Dead-zone_quantizers, printed on Apr. 6, 2022, 12 pages.

(Continued)

*Primary Examiner* — Amir Alavi
(74) *Attorney, Agent, or Firm* — McDonnell Boehnen Hulbert & Berghoff LLP

(57) ABSTRACT

Method are provided that exhibit increased quality and compression factor for compressing images. The methods can include generating a set of coefficients indicative of image contents of a block of image pixels at a plurality of spatial frequencies. The set of coefficients is scaled to generate a first set of scaled coefficients. An assessment is performed for a plurality of quantization levels, which includes quantizing a subset of the first set of scaled coefficients according to respective quantization levels to generate a quantized subset of the first set of scaled coefficients and determining a post-quantization energy of the quantized subset of the first set of scaled coefficients. Based on the assessment of the plurality of quantization levels, a scaled and quantized version of the set of coefficients is generated. An encoded version of the image based on the scaled and quantized version of the set of coefficients is generated.

20 Claims, 5 Drawing Sheets

(56) References Cited

U.S. PATENT DOCUMENTS

| | | | | |
|---|---|---|---|---|
| 5,291,282 | A * | 3/1994 | Nakagawa | H04N 19/172 |
| | | | | 375/E7.181 |
| 5,293,434 | A * | 3/1994 | Feig | H04N 19/60 |
| | | | | 382/250 |
| 5,325,125 | A * | 6/1994 | Naimpally | H04N 19/80 |
| | | | | 375/E7.193 |
| 6,885,702 | B1 * | 4/2005 | Goudezeune | H04N 19/61 |
| | | | | 382/250 |
| 8,290,056 | B2 * | 10/2012 | Stein | H04N 19/80 |
| | | | | 375/240.18 |
| 9,918,116 | B2 * | 3/2018 | Robinson | H04N 21/440263 |
| 11,178,430 | B2 * | 11/2021 | Milanfar | H04N 19/86 |
| 11,475,602 | B2 * | 10/2022 | Kelly | H04N 19/112 |
| 2003/0179937 | A1 * | 9/2003 | Brake | H04N 19/60 |
| | | | | 375/E7.231 |
| 2014/0105277 | A1 | 4/2014 | Bivolarsky et al. | |
| 2023/0147376 | A1 * | 5/2023 | Alakuijala | H04N 19/18 |
| | | | | 382/232 |

OTHER PUBLICATIONS

Wikipedia, Deadband, https://en.wikipedia.org/wiki/Deadband, printed on Apr. 6, 2022, 2 pages.

Stankowski et al., "Rate-distortion optimized quantization in HEVC: Performance limitations", 2015 Picture Coding Symposium (PCS), IEEE, May 31, 2015, pp. 85-89.

International Search Report and Written Opinion mailed Jun. 17, 2020 for International Application No. PCT/US2019/056049, 17 pages.

* cited by examiner

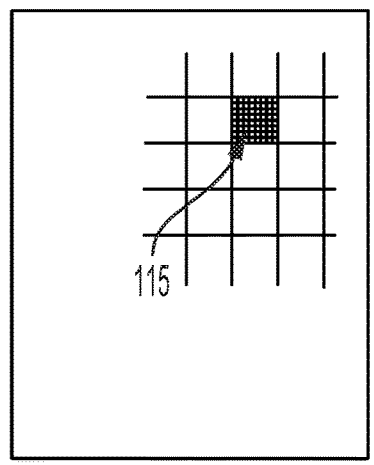
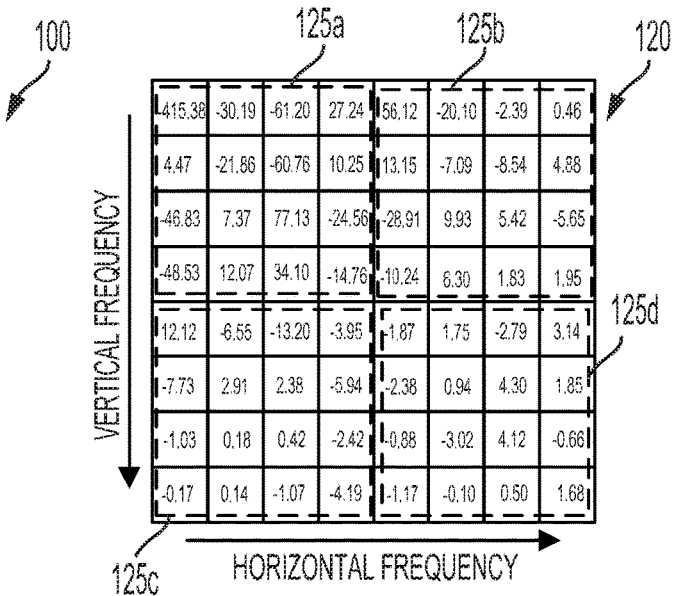
FIG. 1A
FIG. 1B
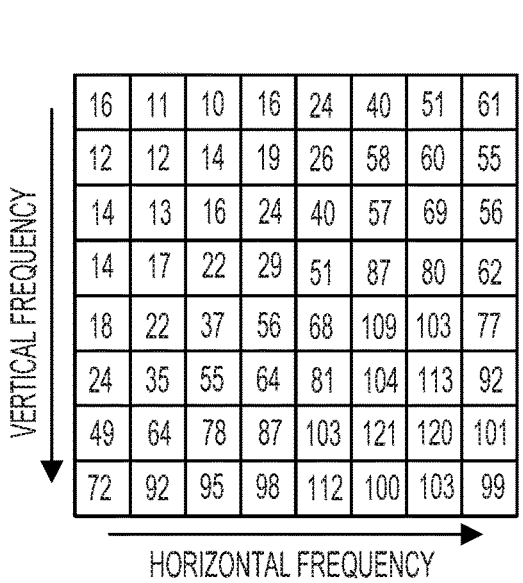
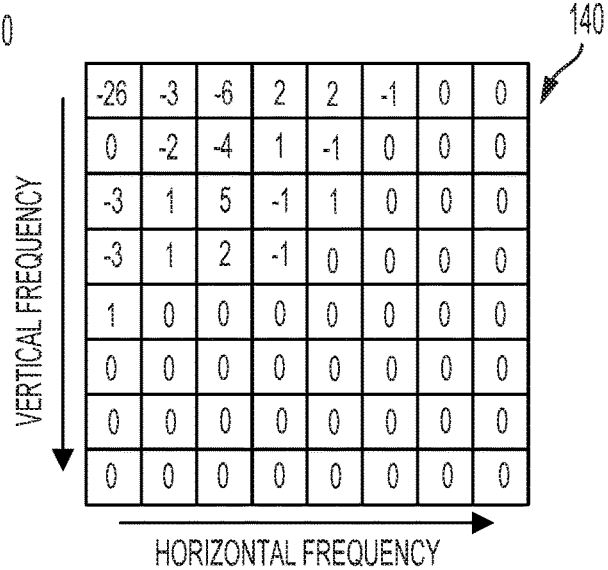
FIG. 1C
FIG. 1D

FIG. 2
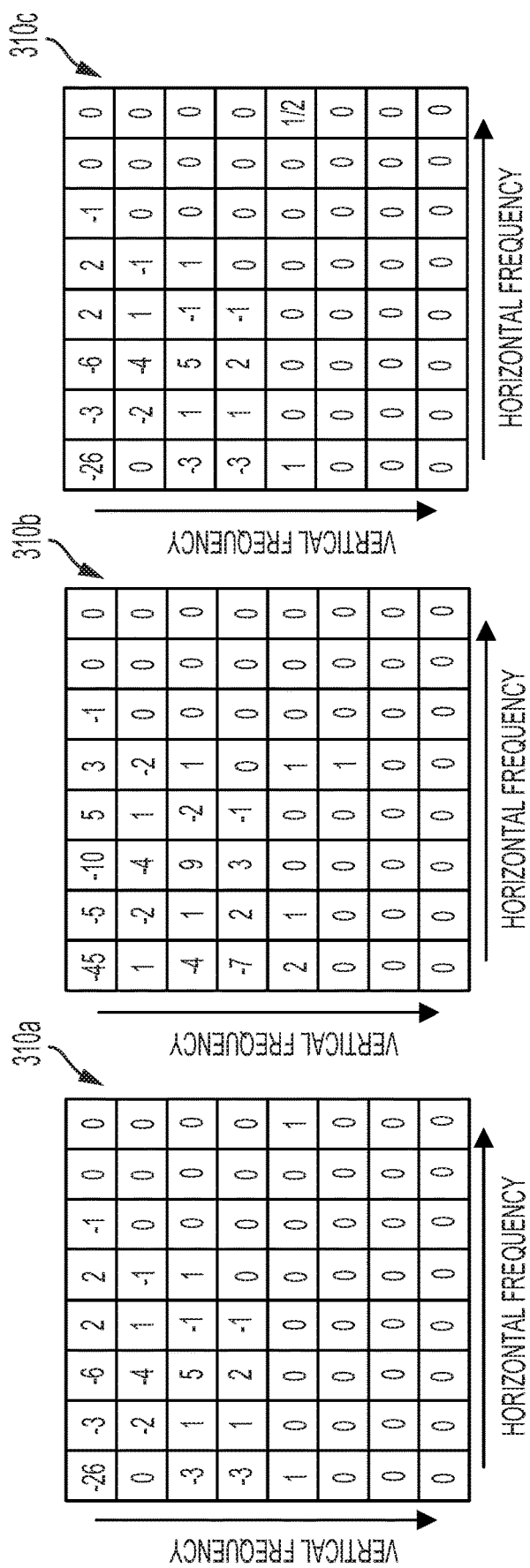
FIG. 3A
FIG. 3B
FIG. 3C

ADAPTIVE QUANTIZATION AND DEAD ZONE MODULATION

CROSS-REFERENCE TO RELATED APPLICATIONS

This application is a US national phase application of International Patent Application No. PCT/US2019/056049 filed on Oct. 14, 2019, which is incorporated herein by reference in its entirety.

BACKGROUND

Digital images may be compressed in order to provide advantages such as reducing the costs of storage and/or transmission of the digital images. A variety of lossy and lossless methods for image compression exist. Lossy image compression methods result in a compressed version of an input image that cannot be used to regenerate the input image exactly. Nonetheless, such lossy compression methods permit the generation of output images that appear sufficiently similar to the input image to human perception so as to be acceptable in at least some contexts. Some lossy image compression techniques may permit this degree of similarity to be traded for increased compression ratios, allowing for smaller compressed image file sizes in return for reduction in the image quality of the output, compressed image.

SUMMARY

A variety of methods exist for compressing images. These methods allow for reduction in the size of the images while preserving the subjective appearance of the images following the compression (or encoding) process. "Lossy" compression methods result in encoded images that cannot be used to perfectly reconstruct a source image. However, such lossy methods can be used to generate an encoded image representation that can be used to reconstruct a version of the source image that is not immediately distinguishable by most viewers from the source image, or that is otherwise acceptable in accordance with at least certain criteria in at least some contexts. Such lossy methods can provide significant compression ratios compared to lossless compression methods.

Many types of lossy compression methods achieve these compression ratios by performing one or more quantization steps on the pixels themselves, or on coefficients determined therefrom (e.g., coefficients corresponding to different spatial frequency components of the pixels). Such quantization steps allow the bit depth of the encoded versions of the image information (e.g., of the pixels, or of the coefficients determined therefrom) to be reduced, reducing the size of the encoded version of the image. Additionally, the image information may be scaled prior to quantization such that many of the scaled image coefficients become '0' following quantization. If the proportion of such '0's is high enough, the size of the encoded version of the image may be further reduced by using run-length encoding or other methods to take advantage of the high proportion of such '0's in the scaled and quantized version of the source image.

The scaling factors used to scale the spatial frequency coefficients of a source image may be selected in order to improve a quality and/or a compression ratio of images encoded using the scale factors. The thresholds for quantization of the coefficients scaled by the set of scaling factors may also be adjusted in order to improve the compression ratio and/or to improve the quality of the encoded image. For example, adjusting the quantization threshold used to determine whether a particular coefficient is quantized to a '0' value can allow the number of '0's, and thus the compressibility of the image, to be directly adjusted. A variety of different quantization levels could be assessed (e.g., with respect to encoded image quality, with respect to spared image energy in one or more bands of spatial frequencies), and the lowest quantization level that satisfies an image quality threshold could be used to encode the image, or to encode a subset of coefficients of the image. Selecting a quantization level in such a manner can beneficially result in the most '0' values following quantization (so as to minimize the encoded image size) while still satisfying the image quality criterion. Adaptively setting the quantization level during encoding in this manner can also beneficially avoid computational steps involving adaptation of the decoder used to decode the encoded image.

Additional or alternative methods could be applied to improve the compression ratio of an image while also conserving or improving encoded image quality. These methods could be performed when the above adaptive quantization methods fail (e.g., when none of the evaluated quantization levels resulted in satisfaction of the image quality criterion), or they may be performed in other contexts. For example, only a single quantization level might be used to encode a source image, but failure of that single quantization level to satisfy the image quality criterion could result in application of one or more supplementary methods. A first supplementary method includes determining, for a subset of image coefficients within a particular band of spatial frequencies, which of the coefficients is the maximum coefficient, and setting the local quantization level such that the maximum coefficient is quantized to a non-zero value. A second supplementary method includes choosing a different set of scaling factors to scale the image contents prior to quantization. A third supplementary method includes representing one or more of the coefficients with a symbol representing a value of ½, ¼, or some other sub-unity value. A fourth supplementary method includes adding noise (e.g., blue noise) to the image coefficients prior to quantization or adjusting an amount of noise added to the image coefficients prior to quantization.

An aspect of the present disclosure relates to a method for encoding an image, the method including: (i) generating, based on a block of pixels of the image, a set of coefficients indicative of image contents of the block of pixels at a plurality of spatial frequencies, wherein each coefficient in the set of coefficients is for a respective spatial frequency in the plurality of spatial frequencies; (ii) scaling the set of coefficients according to a first set of scaling factors to generate a first set of scaled coefficients; (iii) performing an assessment of a plurality of quantization levels; (iv) generating a scaled and quantized version of the set of coefficients based on the assessment of the plurality of quantization levels; and (v) generating an encoded version of the image based on the scaled and quantized version of the set of coefficients. Performing the assessment includes, for each respective quantization level of the plurality of quantization levels: (a) quantizing a subset of the first set of scaled coefficients according to the respective quantization level to generate a quantized subset of the first set of scaled coefficients, wherein the subset of the first set of scaled coefficients are for spatial frequencies within a first band of spatial frequencies; and (b) determining a post-quantization energy of the quantized subset of the first set of scaled coefficients.

The assessment may further comprise (c) comparing the post-quantization energy to a threshold energy criterion.

The assessment of the plurality of quantization levels may be performed iteratively from a maximum quantization level toward a minimum quantization level. The maximum quantization level may be more than 0.675. The maximum quantization level may be more than 0.575. The minimum quantization level may be less than 0.325. Comparing the post-quantization energy to the threshold energy criterion for a particular quantization level may comprise determining that the post-quantization energy satisfies the threshold energy criterion. Generating a scaled and quantized version of the set of coefficients based on the assessment of the plurality of quantization levels may comprise using the particular quantization level to quantize the subset of the first set of scaled coefficients that are for spatial frequencies within the first band of spatial frequencies. Performing the assessment of the plurality of quantization levels may comprise determining that none of the plurality of quantization levels satisfies the threshold energy criterion. Generating a scaled and quantized version of the set of coefficients based on the assessment of the plurality of quantization levels may comprise, responsive to determining that none of the plurality of quantization levels satisfies the threshold energy criterion: identifying a maximum scaled coefficient within the subset of the first set of scaled coefficients that are for spatial frequencies within the first band of spatial frequencies; determining a quantization level that is less than a value of the identified maximum scaled coefficient; and using the determined quantization level to quantize the subset of the first set of scaled coefficients that are for spatial frequencies within the first band of spatial frequencies. The method may further comprise: determining the first set of scaling factors based on the block of pixels of the image. Performing the assessment of the plurality of quantization levels may comprise determining that none of the plurality of quantization levels satisfies the threshold energy criterion. Generating a scaled and quantized version of the set of coefficients based on the assessment of the plurality of quantization levels may comprise, responsive to determining that none of the plurality of quantization levels satisfies the threshold energy criterion: determining a second set of scaling factors, wherein at least one scaling factor of the second set of scaling factors is lower in magnitude than a corresponding scaling factor of the first set of scaling factors; using the second set of scaling factors, performing an assessment of the plurality of quantization levels; and based on the assessment of the plurality of quantization levels using the second set of scaling factors, generating the scaled and quantized version of the set of coefficients. Performing the assessment of the plurality of quantization levels may comprise determining that none of the plurality of quantization levels satisfies the threshold energy criterion. Generating an encoded version of the image based on the scaled and quantized version of the set of coefficients may comprise, responsive to determining that none of the plurality of quantization levels satisfies the threshold energy criterion, representing at least one of the coefficients within the subset of the first set of scaled coefficients that are for spatial frequencies within the first band of spatial frequencies with a symbol representing a sub-unity value. The symbol representing a sub-unity value may represent one of a one-half value, a one-quarter value, or a one-eighth value. Determining that none of the plurality of quantization levels satisfies the threshold energy criterion may comprise determining that each quantization level of the plurality of quantization levels results in a post-quantization energy of zero. The method may further comprise: determining an energy of a first subset of the set of coefficients indicative of image contents, wherein the first subset of the set of coefficients indicative of image contents are indicative of respective spatial frequencies within the first band of spatial frequencies. Comparing the post-quantization energy to a threshold energy criterion may comprise comparing a ratio between the post-quantization energy and the energy of the first subset of the set of coefficients to a threshold energy. The first band of spatial frequencies may comprise low spatial frequencies in a horizontal direction and low spatial frequencies in a vertical direction. The first band of spatial frequencies may comprise low spatial frequencies in a horizontal direction and high spatial frequencies in a vertical direction. The first band of spatial frequencies may comprise high spatial frequencies in a horizontal direction and low spatial frequencies in a vertical direction. The first band of spatial frequencies may comprise high spatial frequencies in a horizontal direction and high spatial frequencies in a vertical direction. The set of coefficients indicative of image contents may be discrete cosine transform coefficients or coefficients of some other transform (e.g., an over-complete transform).

Another aspect of the present disclosure relates to a method for encoding an image, the method including: (i) generating, based on a block of pixels of the image, a set of coefficients indicative of image contents of the transformed block of pixels at a plurality of spatial frequencies, wherein each coefficient in the set of coefficients is for a respective spatial frequency in the plurality of spatial frequencies; (ii) scaling a subset of the set of coefficients according to a first set of scaling factors to generate a first subset of scaled coefficients, wherein the subset of the set of coefficients are for respective spatial frequencies within a first band of spatial frequencies; (iii) quantizing the first subset of scaled coefficients to generate a first set of scaled, quantized coefficients; (iv) determining a post-quantization energy of the first subset of scaled, quantized coefficients; (v) determining that the post-quantization energy does not satisfy a threshold energy criterion; and (vi) responsive to determining that the post-quantization energy does not satisfy the threshold energy criterion, applying at least one process from a set of processes to generate an encoded version of the image. The set of processes includes a first process that includes: (a) identifying a maximum scaled coefficient within the first subset of scaled coefficients; (b) determining a quantization level that is less than a value of the identified maximum scaled coefficient; (c) using the determined quantization level to quantize the first subset of scaled coefficients. The set of processes includes a second process that includes: (a) determining a second set of scaling factors, wherein at least one scaling factor of the second set of scaling factors is lower in magnitude than a corresponding scaling factor of the first set of scaling factors; (b) scaling the subset of the set of coefficients according to the second set of scaling factors to generate a second subset of scaled coefficients, wherein the subset of the set of coefficients are indicative of respective spatial frequencies within the first band of spatial frequencies; and (c) quantizing the second subset of scaled coefficients to generate a second set of scaled, quantized coefficients. The set of processes includes a third process that includes representing, in the encoded version of the image, at least one of the subset of the set of coefficients that are indicative of respective spatial frequencies within the first band of spatial frequencies with a symbol representing a sub-unity value. The set of processes includes a fourth process that includes adding blue noise to the first subset of scaled coefficients prior to quantizing the first subset of scaled coefficients. The set of processes includes a fifth process that includes adjusting an amount of blue noise added to the first subset of scaled coefficients prior to quantizing the first subset of scaled coefficients.

The symbol representing a sub-unity value may represent one of a one-half value, a one-quarter value, or a one-eighth value. Determining that the post-quantization energy does not satisfy a threshold energy criterion may comprise determining that the post-quantization energy is zero. The first band of spatial frequencies may comprise low spatial frequencies in a horizontal direction and low spatial frequencies in a vertical direction. The first band of spatial frequencies may comprise low spatial frequencies in a horizontal direction and high spatial frequencies in a vertical direction. The first band of spatial frequencies may comprise high spatial frequencies in a horizontal direction and low spatial frequencies in a vertical direction. The first band of spatial frequencies may comprise high spatial frequencies in a horizontal direction and high spatial frequencies in a vertical direction. The set of coefficients indicative of image contents may be discrete cosine transform coefficients or coefficients indicative of some other transform (e.g., an over-complete transform). The blue noise added to the first subset of scaled coefficients could be band-limited blue noise that is limited to spatial frequencies within the first band of spatial frequencies.

It will be appreciated that features described in the context of the first aspect can be implemented in the context of the second aspect. These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1A illustrates an example image.

FIG. 1B illustrates an example frequency-based decomposition of a portion of the image of FIG. 1A.

FIG. 1C illustrates an example quantization table.

FIG. 1D illustrates the frequency-based decomposition of FIG. 1B following scaling and quantization.

FIG. 2 illustrates example quantization levels and example scaled coefficient values.

FIG. 3A illustrates an example frequency-based decomposition of a portion of an image following scaling and quantization.

FIG. 3B illustrates an example frequency-based decomposition of a portion of an image following scaling and quantization.

FIG. 3C illustrates an example frequency-based decomposition of a portion of an image following scaling and quantization.

DETAILED DESCRIPTION

Figure 4:
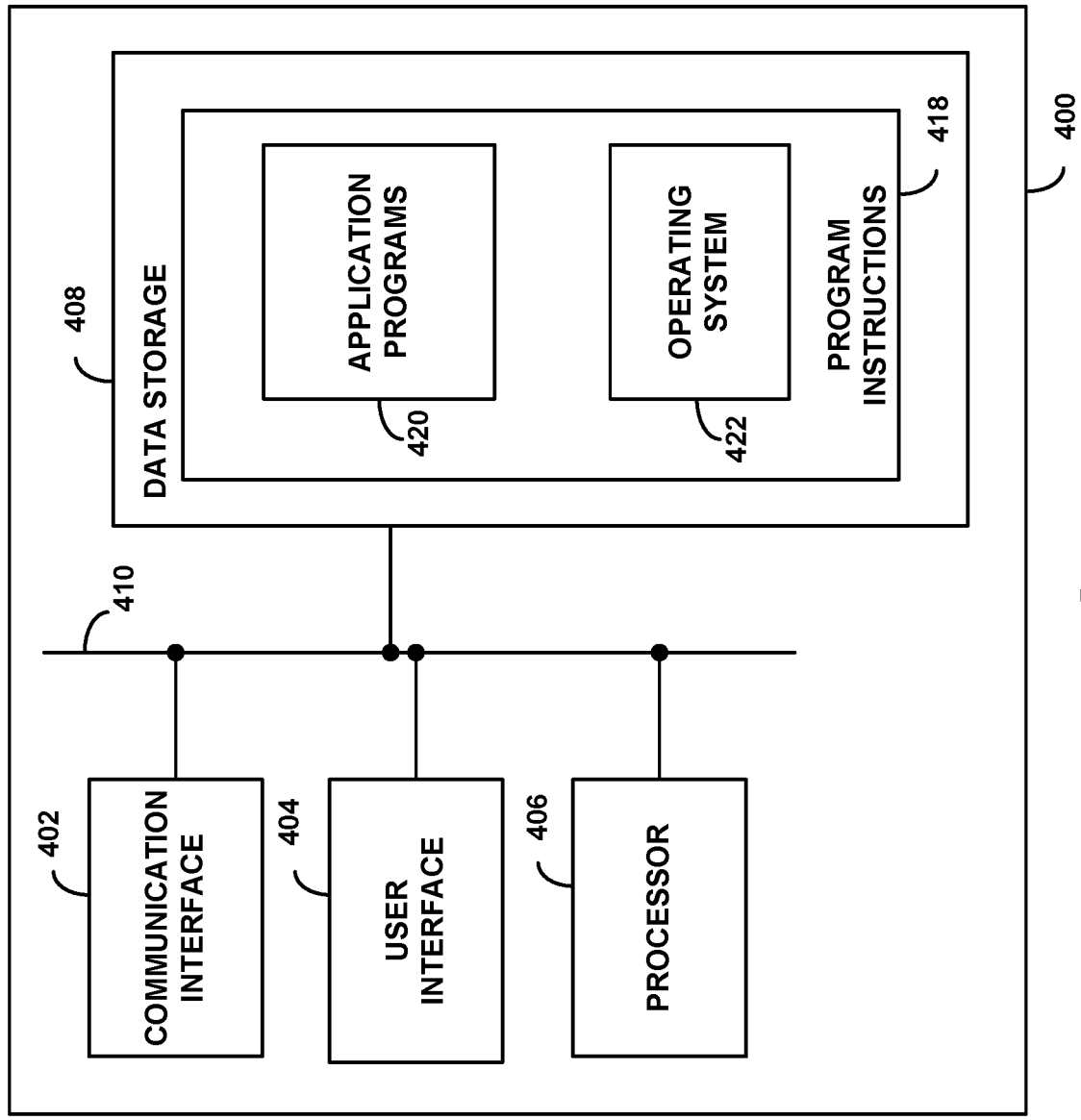
FIG. 4 is a simplified block diagram showing some of the components of an example system.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

It should be understood that the below embodiments, and other embodiments described herein, are provided for explanatory purposes, and are not intended to be limiting.

I. EXAMPLE IMAGE ENCODING AND COMPRESSION

In a variety of applications, it can be beneficial to encode images or other information such that the images or other information can be reduced in size. As a result of such encoding, less storage space and/or bandwidth can be used to store, transmit, copy, or otherwise manipulate or use the images or other information. The encoding (or compression) can be lossless or lossy. Lossless compression reduces the size of the information in a manner that permits the information to be later restored, exactly, to its pre-compression state. Lossy compression does not. Instead, lossy compression may permit a trade-off between the degree of compression possible and the "quality" of the image or other information that may be later recovered from the compressed version of the image or other information.

Such trade-offs can be implemented based on the intended use of the compressed information. For example, when compressing images, the compression method may take into account the properties of human vision (e.g., the increased sensitivity of the eye to luminance relative to chrominance) such that the compression process may discard or distort information from the image in ways that are less detectable by the human eye. For example, the encoding method may take into account the increased sensitivity of the human eye to luminance relative to chrominance by downsampling chrominance information, by reducing a bit depth at which chrominance information is stored relative to luminance information, and/or by using a different, lower-quality quantization table or other parameters for encoding the chrominance information relative to the luminance information. In another example, higher-spatial-frequency contents of the image may be quantized, rounded, or otherwise degraded during encoding to a greater degree than lower-spatial-frequency contents. Accordingly, the size of the compressed image may be reduced while maintaining an overall level of apparent image quality.

Encoding of an image may be partially implemented by first transforming the image into a different color representation. For example, an image with a red-green-blue (RGB) representation could be converted into a luminance-chrominance (YUV) representation. Alternatively or additionally, the encoding could involve downsampling the source image (e.g., downsampling the chrominance channels of the image), applying linear or nonlinear filters, quantizing/rounding the pixel values of the image, or performing some other manipulations on the image "in the image space" prior to applying any transformation of the image data from the two-dimensional pixel space of the image into a spatial frequency space or some other space. This pre-processed image data can then be translated into another domain, e.g., a spatial frequency domain where further compression may occur.

Such an alternative space may be chosen such that the representation of the image in the alternative space is "sparse." That is, the representation in the alternative space may include a small subset of representative coefficients that contain "most" of the image (e.g., that have substantially non-zero values) with respect to, e.g., the overall energy in the image while a more numerous remainder subset of the representative coefficients have values at or near zero and thus represent a small portion of the image content of the source image. Accordingly, the remainder subset can be discarded, reducing the total size of the encoded image while maintaining the majority of the perceivable content and/or energy of the source image. Such a process could include quantizing or otherwise rounding (e.g., rounding down) the coefficients, e.g., following a scaling process to emphasize those coefficients found to be more "important" to human visual perception (e.g., lower spatial frequencies). Such an alternative space could include a spatial frequency space (e.g., represented by discrete cosine transformation coefficients of the image-space data), a kernel-based space, or some other transform space. The image could be represented in the alternative space in an over-complete manner (e.g., with more coefficients than are strictly necessary to represent the image, informationally).

FIG. 1A illustrates an example image 100, or a particular color channel of such an image (e.g., luminance channel, a chrominance channel), that could be encoded. The image 100 is composed of a plurality of pixels (a sample of which are illustrated by the small squares in FIG. 1A). In order to encode (e.g., to compress) the image 100 (e.g., according to the JPEG, JPEG XL, or some other image compression format), non-overlapping sets of the pixels (e.g., the example set 115 shown in FIG. 1A) can be individually transformed (e.g., using the discrete cosine transform) into respective sets of coefficients in a transform domain. Performing such a transformation on restricted subsets of the image, rather than on the image as a whole (e.g., generating discrete cosine transform coefficients from the entirety of the image at once), can provide benefits with respect to memory usage, generalizability of the encoder (e.g., across images of different size), optimization of the encoder, or with respect to some other considerations related to the encoding of images. As shown, the non-overlapping sets are eight-by-eight tiles of pixels, but other shapes and sizes of non-overlapping sets could be used.

The illustrated set of pixels 115 of the image 100 could be transformed into a set of coefficients that represent the contents of the set of pixels 115 at respective spatial frequencies. For example, the coefficients could be discrete cosine transform coefficients determined across a range of horizontal and vertical spatial frequencies. An example set of coefficients 120 is illustrated in FIG. 1B. Each coefficient represents the contents of the set of pixels 115 at a respective spatial frequency in the vertical and horizontal directions. For example, the top left coefficient ("−415.38") represents the DC content of the set of pixels 115. In another example, the fourth coefficient from the right in the top row ("56.12") represents content of the set of pixels 115 that does not vary vertically (i.e., that is DC with respect to the vertical direction) while varying at an intermediate spatial frequency horizontally.

Accordingly, subsets of the coefficients 120 can be defined based on whether the individual coefficients 120 are for spatial frequencies within a specified band of spatial frequencies. For example, a first subset 125a of the coefficients 120 are for spatial frequencies within a first band of spatial frequencies that includes low spatial frequencies in the horizontal direction (e.g., the lower half of the range of horizontal spatial frequencies represented in the coefficients 120) and low spatial frequencies in the vertical direction (e.g., the lower half of the range of vertical spatial frequencies represented in the coefficients 120). In another example, a second subset 125b of the coefficients 120 are for spatial frequencies within a second band of spatial frequencies that includes high spatial frequencies in the horizontal direction (e.g., the upper half of the range of horizontal spatial frequencies represented in the coefficients 120) and low spatial frequencies in the vertical direction. In yet another example, a third subset 125c of the coefficients 120 are for spatial frequencies within a third band of spatial frequencies that includes high spatial frequencies in the vertical direction (e.g., the upper half of the range of vertical spatial frequencies represented in the coefficients 120) and low spatial frequencies in the horizontal direction. In a further example, a fourth subset 125d of the coefficients 120 are for spatial frequencies within a fourth band of spatial frequencies that includes high spatial frequencies in the horizontal direction and high spatial frequencies in the vertical direction.

In order to compress these coefficients, the coefficients may be rounded (e.g., rounded down). This could permit the bit depth of the values used to store the coefficients to be reduced. Additionally, coefficients that are rounded down to zero may be omitted from being expressly stored in the resulting encoded image (e.g., by employing a run-length encoding). To increase the level of compression, a set of scaling factors could be applied to scale the coefficients 120 prior to rounding down (or "quantizing") the scaled coefficients. Thus, the scaling factor indicates the degree of scaling to be applied to one or more of the coefficients 120. A single scaling factor could be applied to all of the coefficients. Alternatively, scaling factors from a quantization table could be applied individually to respective coefficients. The factors in such a quantization table can be specified, based on information about human subjective visual perception, to emphasize those coefficients found to be more "important" to human visual perception (e.g., lower spatial frequencies) by applying a smaller-magnitude scaling factor to such coefficients (thus preserving more of the information present in the coefficient by quantizing the coefficient according to a more finely graded scale). Conversely, "less important" coefficients may be de-emphasized by applying a larger-magnitude scaling factor to such coefficients (thus preserving less of the information present in the coefficient by quantizing the coefficient according to a more coarse scale and/or by increasing the likelihood that the coefficient will be omitted entirely by being rounded to zero).

A single set of scaling factors (e.g., a single quantization table) could be applied to scale the coefficients for every block (e.g., 115) of the image 100. Alternatively, a respective set of scaling factors could be determined and used to scale each block of the image 100 individually. This could include selecting, for each block, a set of scaling factors from a number of possible pre-determined sets of scaling factors. In another example, a block-level individualized scaling factor could be determined for each block and used to pre-scale the coefficients for the block before applying a common set of scaling factors and/or to scale a common set of scaling factors before using them to scale the coefficients for the block. When encoding the image 100, information indicative of the scaling factors determined for each block can be included in the encoded image to facilitate decoding of the encoded image. This can include indicating the value of a block-level individualized scaling factor (e.g., within a range from 0-255), providing an indication of an index or other identifying number for a set of scaling factors selected from a number of different pre-determined sets of scaling factors, or indicating some other information sufficient to determine the set of scaling factors to be used to decode each block of an encoded image.

The scaling factors (e.g., the identity of the selected pre-determined set of scaling factors, or the block-level individualized scaling factor) could be determined based on the energy, entropy, or other determined property of the block of pixels and/or the block of coefficients determined therefrom. Additionally or alternatively, the scaling factors could be determined based on information about the image 100 as a whole and/or a particular block's location within the image 100. For example, the scaling factors for a block of the image could be determined based on the proximity of the block to an edge, a face, or some other feature of interest in the image 100.

FIG. 1C shows an example quantization table 130 that includes the scaling factors to be used to scale the coefficients 120. Such a quantization table may be pre-specified by software used to generate encoded images (e.g., software running on a camera, software that is part of an image processing suite) and/or determined on a per-block basis (e.g., to select the quantization table 130 from a number of possible quantization table, to determine a block-level individualized scaling factor to pre-scale a default quantization table in order to generate the quantization table 130). A particular encoded image may include a copy of such a quantization table and/or information representative thereof (e.g., block-level individualized scaling factors, ID values for the quantization table selected individually for each block of an image) to facilitate decoding the encoded image. A decoder could then multiply the image-content coefficients in the encoded image with corresponding elements of the quantization table 130 in order to "scale up" the quantized coefficients so that they may be transformed (e.g., via a discrete cosine transform) into pixel values of a decoded image (e.g., luminance values, chrominance values).

FIG. 1D shows a set of quantized coefficients 140 that have been scaled by respective degrees according to the quantization table 130 (i.e., according to respective scaling factors within the quantization table 130) and then quantized (rounding down). In this example, most of the coefficients 140 have values of zero. As a result, the set of coefficients 140 may be efficiently stored using a run-length encoding. The run-length encoded coefficients may then be further compressed (e.g., using a lossless Huffman coding) before being contained within the final encoded image. The scaled, quantized coefficients 140 have been quantized using a standard set of quantization thresholds, e.g., with scaled values between −0.5 and 0.5 being quantized to '0', scaled values between −1.5 and −0.5 being quantized to '−1', scaled values between 0.5 and 1.5 being quantized to '1', etc. However, different quantization thresholds can be applied, either across all of the blocks of the image or determined for each block individually. For example, the width and location of the 'dead zone' (i.e., the width and location of the range of values that will be quantized to a '0') can be adaptively selected to improve the compression ratio of the encoded version of the image 100 (e.g., by widening the 'dead zone' to result in more of the coefficients 140 being '0') and/or to improve the quality of the encoded version of the image 100 (e.g., by narrowing the 'dead zone' to result in fewer of the coefficients 140 being '0').

II. ADAPTIVE QUANTIZATION BASED ON SPARED IN-BAND ENERGY

In the example illustrated in FIG. 1D, a default quantization threshold of 0.5 was used to generate the scaled, quantized coefficients 140 from the quantization table 130 and the coefficients 120. Accordingly, any of the coefficients 120 that, following scaling by a respective scaling factor of the quantization table 130, had a value between −0.5 and 0.5 were represented, in the scaled, quantized coefficients 140, by a value of 0. The prevalence of such zero values in the scaled, quantized coefficients 140 permits very high compression ratios when representing the scaled, quantized coefficients 140 (e.g., by using run-length encoding).

The number of zeros (and the compression ratio of the resulting encoded image) may be further increased by setting the quantization level used to determine such zero values to a level higher than 0.5. This could be done on the basis of the entire image, or adaptively across blocks, frequency bands, and/or other divisions within the image. For example, the quantization level could be adaptively determined, on a per-block or a per-frequency-band-per-block basis, in order to increase the compression ratio where it will have minimal impact on the resulting encoded image quality (e.g., where the resulting difference in the encoded-image energy is less than a threshold level of reduction). Conversely, the quantization level could be reduced for those portions of the image (e.g., blocks, frequency bands within blocks) where the improvement in image quality is sufficient to justify the corresponding reduction in compression ratio. Such a method of image encoding, using an adaptive quantization level, also has the benefit of being able to use existing downstream decoding software (e.g., without updating the decoding software) to decode images encoded according to the method.

Such an adaptive-quantization encoding method could include, for each portion of an image to be encoded, evaluating a plurality of quantization levels and then using one of the evaluated quantization levels (e.g., the lowest evaluated quantization level that satisfies an image quality criterion) to quantize the portion of the image. The portion thus quantized is then used to generate the encoded version of the input image. The portions could be whole blocks of an image, such that the process is repeated for each block. In another example, the portions could be subsets of coefficients corresponding to respective different frequency bands within each block of the image. For example, a respective quantization level could be determined for each of the subsets 125a, 125b, 125c, 125d of the coefficients 120 of the block 115. Performing the adaptive quantization on such a sub-block level can provide the benefit of allowing frequency bands that usually represent less image energy (e.g., high frequency bands like 215d) to be quantized using lower quantization values. This allows additional non-zero elements to be 'allocated' to those frequency bands where the effect of such allocation is more likely to have a greater positive impact on overall encoded image quality, by using lower quantization levels to be used to quantize coefficients corresponding to such frequency bands.

FIG. 2 illustrates a plurality of quantization levels 220 that could be assessed by such an adaptive quantization method. Each quantization level of the plurality of quantization levels 220 could be assessed to determine whether it, when used to quantize a set of scaled image coefficients, satisfies an image quality criterion. FIG. 2 illustrates the values of example scaled image coefficients 210 above the plurality of quantization levels 220.

The plurality of quantization levels 220 could be assessed iteratively from a maximum quantization level (e.g., a level of 0.7, as depicted in FIG. 2) to a minimum quantization level (e.g., a level of 0.3, as depicted in FIG. 2). The lowest value that satisfies the image quality criterion could then be selected and used to quantize the scaled coefficients 210 to be used in generating an encoded version of the input image. Assessing the quantization values iteratively from a maximum value to a minimum value may also enable computational time/effort to be used efficiently. For example, the assessment could be halted at the first quantization value that fails to satisfy the image quality criterion, and the preceding, higher quantization value that satisfies the image quality criterion could then be used to generate the encoded image.

In an example, the quantization levels 220 could be iteratively assessed in this manner until quantization level $l_1$ fails to satisfy the image quality criterion. The preceding quantization level could be used, resulting in only one of the scaled coefficients 210 (the right-most coefficient) being represented by a non-zero value in the encoded version of the image. This represents a potential increase in compression ratio compared to using a default quantization level of 0.5, which would have resulted in three of the scaled coefficients 210 being represented by a non-zero value in the encoded version of the image.

In another example, the quantization levels 220 could be iteratively assessed in this manner until level $l_2$ fails to satisfy the image quality criterion. The preceding quantization level could be used, resulting in four of the scaled coefficients 210 (the four right-most coefficients) being represented by non-zero values in the encoded version of the image. This represents a potential decrease in compression ratio compared to using a default quantization level of 0.5, which would have resulted in three of the scaled coefficients 210 being represented by a non-zero value in the encoded version of the image. However, this could also represent an increase in the quality of the encoded image, as the default quantization level of 0.5 would have resulted in a quantization that failed with respect to the image quality criterion. Thus, the adaptive quantization methods described herein can result in non-zero elements being 'allocated' where they can have the greatest benefit, improving the quality and/or increasing the compression ratio of the encoded image.

As shown in FIG. 2, the quantization levels 220 span a range from 0.3 to 0.7. These boundaries can provide benefits as regards compression ratio and image quality in at least some contexts. However, sets of quantization levels spanning other ranges can provide benefits. For example, the maximum quantization level could be a value greater than 0.675, or greater than 0.575. In some examples, the minimum quantization level could be a value less than 0.325. Additionally, the spacing and location of the quantization levels shown in FIG. 2 is intended as a non-limited example of the values of quantization levels that could be assessed according to the methods described herein. Alternative numbers, spacings, ranges, or other properties of such a plurality of quantization values could be used. The individual quantization values could be evenly or unevenly spaced across a range of values.

Assessing a particular quantization value with respect to an image quality criterion can include a variety of processes. In some examples, assessing the particular quantization value could include quantizing a subset of scaled coefficients (e.g., a subset of the scaled coefficients from a particular image block that are for spatial frequencies within a particular band of spatial frequencies) using the particular quantization value. The quantized values could then be assessed with respect to the image quality criterion. This assessment can include determining a post-quantization energy of the quantized values (e.g., by squaring and summing the quantized values). This determined post-quantization energy could then be compared to a threshold energy criterion. Such a threshold energy criterion could be relative, e.g., relative to the energy in the scaled coefficients before quantization. For example, a ratio between the post-quantization energy and the energy of the scaled coefficients before quantization, and the determined ratio could be compared to a threshold value. Such a threshold energy criterion could be absolute, e.g., failing to satisfy the threshold energy criterion could include having a post-quantization energy that is zero.

In some examples, none of the plurality of quantization levels could satisfy the image quality criterion. In such examples, a default quantization level (e.g., a level of 0.5, the minimum quantization level assessed, or some other default level) could be used to quantize the relevant scaled coefficients of the input image. Additionally or alternatively, one or more of the image quality improvement methods described below could be applied.

III. SUPPLEMENTARY ADAPTIVE ENCODING BASED ON SPARED IN-BAND ENERGY

As described above, a variety of methods can be employed to adaptively set, by block and/or by frequency band, the quantization levels used to encode a source image. These methods can allow for reduced encoded image size and/or improved encoded image quality. Additionally or alternatively, other methods can be used to improve encoded image quality in a manner that is block-selective and/or frequency band-selective such that a corresponding increase in the encoded image size is reduced. One or more of these supplementary methods could be applied when the iterative assessment method above fails, e.g., when it is determined that none of the assessed quantization levels satisfies a threshold energy criterion or some other image quality criterion. Alternatively, one or more of these supplementary methods could be applied in some other context. For example, a default quantization level could be applied (e.g., a quantization level of 0.5), and if that default level fails to satisfy the threshold energy criterion or other image quality criterion, one or more of these additional methods could be applied.

A first supplementary method includes setting the quantization level to a value that is sufficiently low that, when applied, it results in at least one of the scaled coefficients being quantized to a non-zero (e.g., unity) value. This could be effected by identifying the maximum coefficient within a subset of coefficients (e.g., that are for spatial frequencies within a specified band of spatial frequencies), setting the quantization level to a value less than the value of the identified scaled coefficient (e.g., to a specified fraction of the value of the identified scaled coefficient, to a specified amount less than the value of the identified scaled coefficient). The set quantization level could then be applied to quantize the scaled coefficients. Alternatively, this method could be effected by identifying the maximum coefficient within a subset of coefficients and then setting the quantized value of the identified scaled coefficient to one. Such a method has the benefit of ensuring that at least one of the coefficients in a particular block and/or frequency band is represented by a non-zero value, and thus that the energy in a corresponding frequency band is greater than zero.

FIG. 3A illustrates a set of quantized coefficients $310a$ that have been scaled by respective degrees according to the quantization table 130 and then quantized. The subset of the quantized coefficients $310a$ that are for spatial coefficients within the fourth frequency band $125d$ have been quantized according to the first supplementary method. Accordingly, the set of quantized coefficients $310a$ contains a '1'-valued coefficient corresponding to the highest-valued scaled coefficient (i.e., the coefficient in the rightmost column, four rows from the bottom).

A second supplementary method includes modifying or otherwise changing the set of scaling factors used to scale the image coefficients prior to quantization. As described above, some image encoding methods may include determining the set of scaling coefficients prior to applying them to encode a portion of the image. This can include selecting the set of scaling coefficients from a plurality of possible sets (e.g., selecting a quantization table from a set of possible quantization tables), determining a pre-scaling factor to scale the image coefficients prior to applying a set of scaling coefficients or to scale the image coefficients prior to applying the set of scaling coefficients, or performing some other process to determine a set of scaling coefficients on a block-by-block and/or frequency band-by-frequency band basis. The determination of the set of scaling factors could be based on the energy, entropy, or other determined property of the block of pixels and/or the block of coefficients determined therefrom. Additionally or alternatively, the scaling factors could be determined based on information about the source image as a whole and/or a particular block's location within the image. For example, the scaling factors for a block of the image could be determined based on the proximity of the block to an edge, a face, or some other feature of interest in the image such that regions and/or features of interest within the image are represented, in the encoded image, at higher fidelity.

In response to determining that another method of image scaling and/or quantization has failed to satisfy an image quality criterion when using a first set of scaling factors to scale and quantize a block or other portion of a source image, the second supplementary method determines a second, different set of scaling factors and using those scaling factors to scale and quantize the block or other portion of the source image. The second set of scaling factors differ from the first set of scaling factors in that at least one scaling factor of the second set of scaling factors is lower in magnitude than a corresponding scaling factor of the first set of scaling factors. Accordingly, scaling a set of image coefficients with the second set of scaling factors should allow as much or more energy from the set of coefficients to be represented in an output set of scaled, quantized coefficients when compared to the use of the first set of scaling factors. Such a method could be applied iteratively. For example, if a set of scaled, quantized coefficients generated using the second set of scaling factors also fails to satisfy an image quality criterion, a third set of scaling factors could be determined and applied.

FIG. 3B illustrates a set of quantized coefficients $310b$ that have been scaled by respective degrees according to a second set of scaling factors and then quantized. The second set of scaling factors differs from the first set of scaling factors in the quantization table 130 in that at least one scaling factor of the second set of scaling factors is lower in magnitude than a corresponding scaling factor of the first set of scaling factors. Accordingly, the set of quantized coefficients $310b$ represents more energy and/or image content than the set of quantized coefficients 140 generated using the first set of scaling factors 130. In particular, there is at least one non-zero coefficient for spatial frequencies in the fourth band of spatial frequencies $125d$.

A third supplementary method includes representing at least one of the scaled coefficients, in the encoded version of the image, with a symbol that represents a sub-unity (e.g., fractional) value. This could be effected by applying, to the scaled coefficients, one or more additional quantization levels corresponding to the one or more sub-unity symbols. The one or more symbols used to represent such scaled coefficients could represent a value of $\frac{1}{2}$, $\frac{1}{4}$, $\frac{1}{8}$, or some other sub-unity value. Such symbols could be represented in the encoded image by reserved values of a fixed-bit-width number (e.g., values 0-254 of an 8-bit number could represent scaled and quantized coefficients having values from 0 to 254, while the value 255 could represent a value of $\frac{1}{2}$), an escape character and/or associated information bits, or by some other indication. Such a method has the benefit of ensuring that at least one of the coefficients in a particular block and/or frequency band is represented by a non-zero value, and thus that the energy in a corresponding frequency band is greater than zero.

FIG. 3C illustrates a set of quantized coefficients $310c$ that have been scaled by respective degrees according to the quantization table 130 and then quantized. The subset of the quantized coefficients $310c$ that are for spatial coefficients within the fourth frequency band $125d$ have been quantized according to the third additional method. Accordingly, the set of quantized coefficients $310c$ contains a '$\frac{1}{2}$'-valued coefficient that corresponds to the highest-valued scaled coefficient (i.e., the coefficient in the rightmost column, four rows from the bottom) and that will be represented, in the encoded image, by a symbol representing a value of $\frac{1}{2}$.

A fourth supplementary method includes adding blue noise (or other random or pseudo-random noise) to the image coefficients prior to quantization, or adjusting a magnitude of blue noise added, by default, to the image coefficients prior to quantization. This could be done to increase the amount of energy in a particular band of spatial frequencies within the image by increasing the amount or magnitude of dithering applied to the image prior to quantization. For example, an image that would, without adding and/or adjusting the amount of added blue noise in the particular band of spatial frequencies, have no energy in the particular band of spatial frequencies subsequent to scaling and quantization could, instead, be represented by some non-zero energy in the particular band of spatial frequencies following image encoding. In some examples, the added blue noise (or other variety of noise) could be band-limited to the particular band of spatial frequencies that did not satisfy an energy criterion.

VI. EXAMPLE SYSTEMS

Computational functions (e.g., functions to transform pixels of an image into frequency contents of the image, to scale and quantize such frequency contents, to assess and/or select quantization factors for blocks of an image, or to perform other image encoding functions) described herein may be performed by one or more computing systems. Such a computing system may be integrated into or take the form of a computing device, such as a mobile phone, tablet computer, laptop computer, server, home automation element, standalone video capture and processing device, cloud computing network, and/or programmable logic controller.

For purposes of example, FIG. 4 is a simplified block diagram showing some of the components of an example computing device 400.

By way of example and without limitation, computing device 400 may be a cellular mobile telephone (e.g., a smartphone), a video camera, a computer (such as a desktop, notebook, tablet, or handheld computer), a personal digital assistant (PDA), a wearable computing device, a server, a cloud computing system (e.g., a networked plurality of servers or other computational units), or some other type of device or combination of devices. It should be understood that computing device 400 may represent a physical device, a particular physical hardware platform on which applications operate in software, or other combinations of hardware and software that are configured to carry out mapping, training, and/or audio processing functions.

As shown in FIG. 4, computing device 400 may include a communication interface 402, a user interface 404, a processor 406, and data storage 408, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an ETHERNET, UNIVERSAL SERIAL BUS (USB), or High-Definition Multimedia Interface (HDMI) port. Communication interface 402 may also take the form of or include a wireless interface, such as a WIFI, BLUETOOTH®, global positioning system (GPS), or wide-area wireless interface (e.g., WIMAX or 3GPP LONG-TERM EVOLUTION (LTE)). However, other forms of physical layer interfaces and other types of standard or proprietary communication protocols may be used over communication interface 402. Furthermore, communication interface 402 may comprise multiple physical communication interfaces (e.g., a WIFI interface, a BLUETOOTH® interface, and a wide-area wireless interface).

In some embodiments, communication interface 402 may function to allow computing device 400 to communicate with other devices, remote servers, access networks, and/or transport networks. For example, the communication interface 402 may function to receive, from a requestor device (e.g., a cellphone, a desktop or laptop computer) a request for an image (e.g., an image on a website, an image stored in a user's online image hosting/storage account, an image used as a thumbnail to indicate the contents of a video related to other content requested by the requestor device), to transmit an indication of an encoded image that has been encoded according to the methods described herein, or some other information. For example, the computing device 400 could be a server, cloud computing system, or other system configured to perform the methods described herein and the remote system could be a cellphone, digital camera, or other device configured to request information (e.g., web pages that may have thumbnails or other images embedded therein) and to receive, from the computing device 400, one or more encoded images that may have been modified as described herein (e.g., to improve the quality of the images, to increase the compression ratio of the images, and/or to reduce the encoded size of the images) or to receive some other information from the computing device 400.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

In some embodiments, user interface 404 may include a display that serves to present video or other images to a user. Additionally, user interface 404 may include one or more buttons, switches, knobs, and/or dials that facilitate the configuration and operation of the computing device 400. It may be possible that some or all of these buttons, switches, knobs, and/or dials are implemented as functions on a touch- or presence-sensitive panel.

Processor 406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing and neural network computation, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., image encoding or other image processing programs to perform any of the methods described herein) installed on computing device 400.

In some examples, portions of the methods described herein could be performed by different devices, according to an application. For example, different devices of a system could have different amounts of computational resources (e.g., memory, processor cycles) and different information bandwidths for communication between the devices. Different portions of the methods described herein could be apportioned according to such considerations.

V. EXAMPLE METHODS

Figure 5:
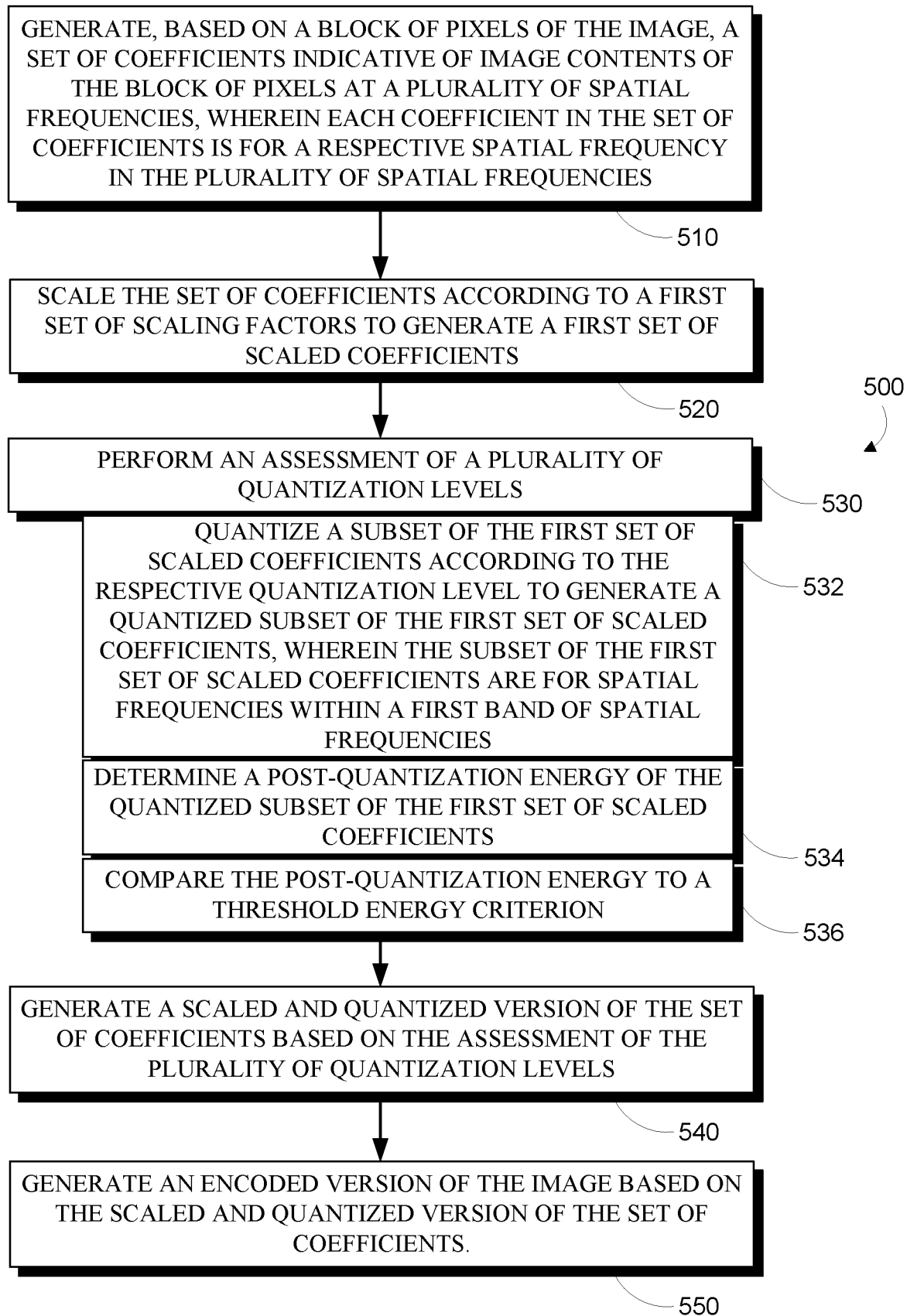
FIG. 5 is a flowchart of a method, according to an example embodiment.

FIG. 5 is a flowchart of a method 500 for encoding images. The method 500 includes generating, based on a block of pixels of the image, a set of coefficients indicative of image contents of the block of pixels at a plurality of spatial frequencies, wherein each coefficient in the set of coefficients is for a respective spatial frequency in the plurality of spatial frequencies (510). The method 500 additionally includes scaling the set of coefficients according to a first set of scaling factors to generate a first set of scaled coefficients (520).

The method 500 yet further includes performing an assessment of a plurality of quantization levels (530). performing the assessment comprises, for each respective quantization level of the plurality of quantization levels: quantizing a subset of the first set of scaled coefficients according to the respective quantization level to generate a quantized subset of the first set of scaled coefficients, wherein the subset of the first set of scaled coefficients are for spatial frequencies within a first band of spatial frequencies (532); determining a post-quantization energy of the quantized subset of the first set of scaled coefficients (534); and comparing the post-quantization energy to a threshold energy criterion (536).

The method 500 additionally includes generating a scaled and quantized version of the set of coefficients based on the assessment of the plurality of quantization levels (540). The method 500 further includes generating an encoded version of the image based on the scaled and quantized version of the set of coefficients (550).

Figure 6:
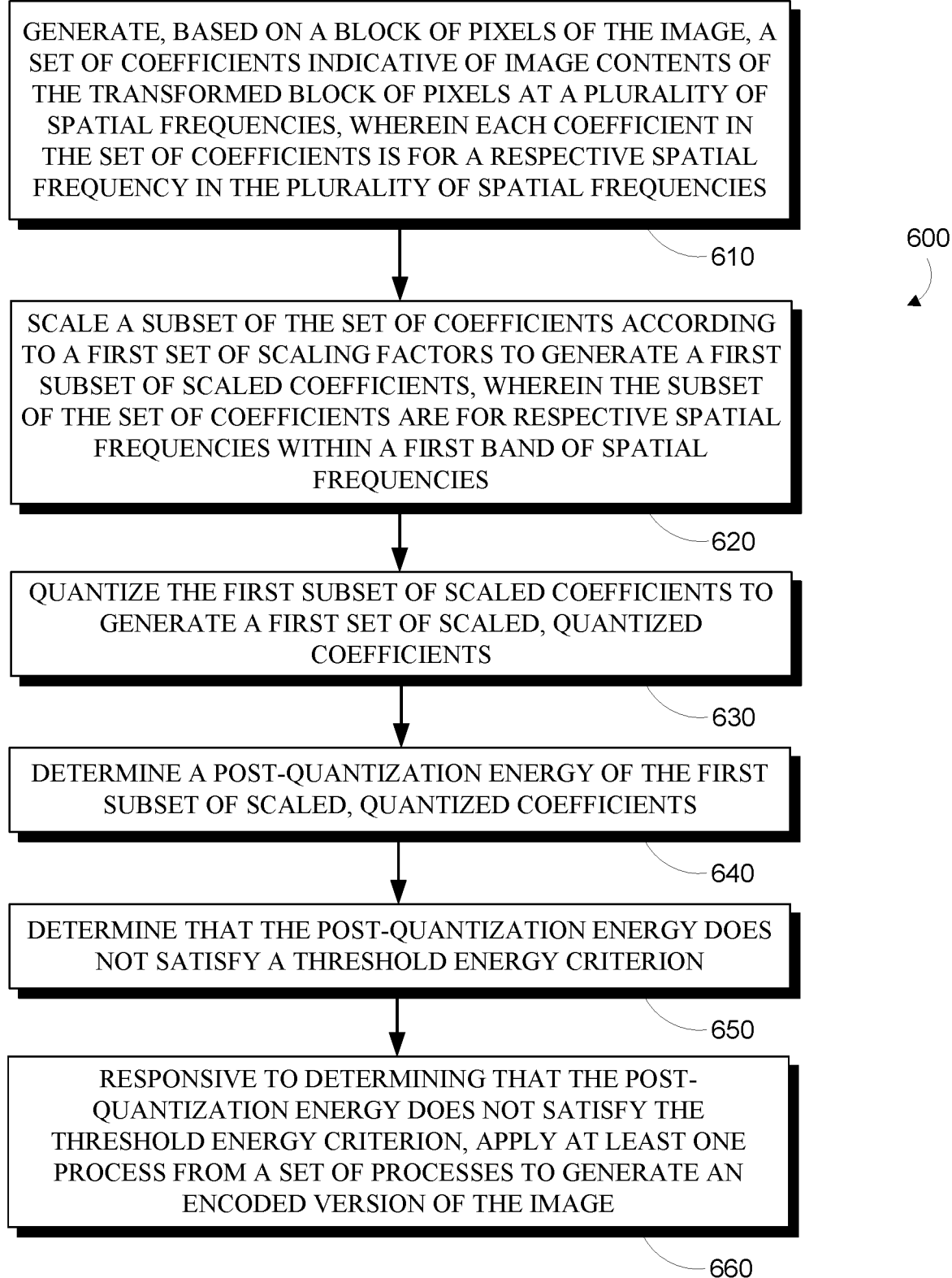
FIG. 6 is a flowchart of a method, according to an example embodiment.

FIG. 6 is a flowchart of a method 600. The method includes generating, based on a block of pixels of the image, a set of coefficients indicative of image contents of the transformed block of pixels at a plurality of spatial frequencies, wherein each coefficient in the set of coefficients is for a respective spatial frequency in the plurality of spatial frequencies (610). The method 600 additionally includes scaling a subset of the set of coefficients according to a first set of scaling factors to generate a first subset of scaled coefficients, wherein the subset of the set of coefficients are for respective spatial frequencies within a first band of spatial frequencies (620).

The method 600 yet further includes quantizing the first subset of scaled coefficients to generate a first set of scaled, quantized coefficients (630); determining a post-quantization energy of the first subset of scaled, quantized coefficients (640); determining that the post-quantization energy does not satisfy a threshold energy criterion (650); and, responsive to determining that the post-quantization energy does not satisfy the threshold energy criterion, applying at least one process from a set of processes to generate an encoded version of the image (660).

The set of processes includes a first process that includes: (a) identifying a maximum scaled coefficient within the first subset of scaled coefficients; (b) determining a quantization level that is less than a value of the identified maximum scaled coefficient; and (c) using the determined quantization level to quantize the first subset of scaled coefficients. The set of processes includes a second process that includes: (a) determining a second set of scaling factors, wherein at least one scaling factor of the second set of scaling factors is lower in magnitude than a corresponding scaling factor of the first set of scaling factors; (b) scaling the subset of the set of coefficients according to the second set of scaling factors to generate a second subset of scaled coefficients, wherein the subset of the set of coefficients are indicative of respective spatial frequencies within the first band of spatial frequencies; and (c) quantizing the second subset of scaled coefficients to generate a second set of scaled, quantized coefficients. The set of processes includes a third process that includes representing, in the encoded version of the image, at least one of the subset of the set of coefficients that are indicative of respective spatial frequencies within the first band of spatial frequencies with a symbol representing a sub-unity value.

Either or both of the methods 500, 600 could include additional elements or features.

VI. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method for encoding an image, the method comprising:
    generating, based on a block of pixels of the image, a set of coefficients indicative of image contents of the block of pixels at a plurality of spatial frequencies, wherein each coefficient in the set of coefficients is for a respective spatial frequency in the plurality of spatial frequencies;
    scaling the set of coefficients according to a first set of scaling factors to generate a first set of scaled coefficients;
    performing an assessment of a plurality of quantization levels, wherein performing the assessment comprises, for each respective quantization level of the plurality of quantization levels:
        quantizing a subset of the first set of scaled coefficients according to the respective quantization level to generate a quantized subset of the first set of scaled coefficients, wherein the subset of the first set of scaled coefficients are for spatial frequencies within a first band of spatial frequencies; and
        determining a post-quantization energy of the quantized subset of the first set of scaled coefficients;
    generating a scaled and quantized version of the set of coefficients based on the assessment of the plurality of quantization levels; and
    generating an encoded version of the image based on the scaled and quantized version of the set of coefficients.

2. The method of claim 1, wherein the assessment of the plurality of quantization levels is performed iteratively from a maximum quantization level toward a minimum quantization level.

3. The method of claim 2, wherein the maximum quantization level is more than 0.575.

4. The method of claim 1, wherein performing an assessment of a plurality of quantization levels further comprises comparing the post-quantization energy to a threshold energy criterion.

5. The method of claim 4, wherein comparing the post-quantization energy to the threshold energy criterion for a particular quantization level comprises determining that the post-quantization energy satisfies the threshold energy criterion, and wherein generating a scaled and quantized version of the set of coefficients based on the assessment of the plurality of quantization levels comprises using the particular quantization level to quantize the subset of the first set of scaled coefficients that are for spatial frequencies within the first band of spatial frequencies.

6. The method of claim 4, wherein performing the assessment of the plurality of quantization levels comprises determining that none of the plurality of quantization levels satisfies the threshold energy criterion, and wherein generating a scaled and quantized version of the set of coefficients based on the assessment of the plurality of quantization levels comprises, responsive to determining that none of the plurality of quantization levels satisfies the threshold energy criterion:
    identifying a maximum scaled coefficient within the subset of the first set of scaled coefficients that are for spatial frequencies within the first band of spatial frequencies; and
    determining a quantization level that is less than a value of the identified maximum scaled coefficient; and
    using the determined quantization level to quantize the subset of the first set of scaled coefficients that are for spatial frequencies within the first band of spatial frequencies.

7. The method of claim 4, further comprising:
    determining the first set of scaling factors based on the block of pixels of the image;
    wherein performing the assessment of the plurality of quantization levels comprises determining that none of the plurality of quantization levels satisfies the threshold energy criterion, and wherein generating a scaled and quantized version of the set of coefficients based on the assessment of the plurality of quantization levels comprises, responsive to determining that none of the plurality of quantization levels satisfies the threshold energy criterion:
        determining a second set of scaling factors, wherein at least one scaling factor of the second set of scaling factors is lower in magnitude than a corresponding scaling factor of the first set of scaling factors;
        using the second set of scaling factors, performing an assessment of the plurality of quantization levels; and
        based on the assessment of the plurality of quantization levels using the second set of scaling factors, generating the scaled and quantized version of the set of coefficients.

8. The method of claim 4, wherein performing the assessment of the plurality of quantization levels comprises determining that none of the plurality of quantization levels satisfies the threshold energy criterion, and wherein generating an encoded version of the image based on the scaled and quantized version of the set of coefficients comprises, responsive to determining that none of the plurality of quantization levels satisfies the threshold energy criterion, representing at least one of the coefficients within the subset of the first set of scaled coefficients that are for spatial frequencies within the first band of spatial frequencies with a symbol representing a sub-unity value.

9. The method of claim 8, wherein the symbol representing a sub-unity value represents one of a one-half value, a one-quarter value, or a one-eighth value.

10. The method of claim 1, further comprising:
    determining an energy of a first subset of the set of coefficients indicative of image contents, wherein the first subset of the set of coefficients indicative of image contents are indicative of respective spatial frequencies within the first band of spatial frequencies, and
    wherein comparing the post-quantization energy to a threshold energy criterion comprises comparing a ratio between the post-quantization energy and the energy of the first subset of the set of coefficients to a threshold energy.

11. The method of claim 1, wherein the first band of spatial frequencies comprises high spatial frequencies in a horizontal direction and high spatial frequencies in a vertical direction.

12. The method of claim 1, wherein the set of coefficients indicative of image contents are discrete cosine transform coefficients.

13. An article of manufacture including a non-transitory computer-readable medium, having stored thereon program instructions that, upon execution by a computing device, cause the computing device to perform operations comprising:
generating, based on a block of pixels of the image, a set of coefficients indicative of image contents of the block of pixels at a plurality of spatial frequencies, wherein each coefficient in the set of coefficients is for a respective spatial frequency in the plurality of spatial frequencies;
scaling the set of coefficients according to a first set of scaling factors to generate a first set of scaled coefficients;
performing an assessment of a plurality of quantization levels, wherein performing the assessment comprises, for each respective quantization level of the plurality of quantization levels:
quantizing a subset of the first set of scaled coefficients according to the respective quantization level to generate a quantized subset of the first set of scaled coefficients, wherein the subset of the first set of scaled coefficients are for spatial frequencies within a first band of spatial frequencies; and
determining a post-quantization energy of the quantized subset of the first set of scaled coefficients;
generating a scaled and quantized version of the set of coefficients based on the assessment of the plurality of quantization levels; and
generating an encoded version of the image based on the scaled and quantized version of the set of coefficients.

14. The article of manufacture of claim 13, wherein the assessment of the plurality of quantization levels is performed iteratively from a maximum quantization level toward a minimum quantization level.

15. The article of manufacture of claim 13, wherein performing an assessment of a plurality of quantization levels further comprises comparing the post-quantization energy to a threshold energy criterion.

16. The article of manufacture of claim 15, wherein comparing the post-quantization energy to the threshold energy criterion for a particular quantization level comprises determining that the post-quantization energy satisfies the threshold energy criterion, and wherein generating a scaled and quantized version of the set of coefficients based on the assessment of the plurality of quantization levels comprises using the particular quantization level to quantize the subset of the first set of scaled coefficients that are for spatial frequencies within the first band of spatial frequencies.

17. The article of manufacture of claim 15, wherein performing the assessment of the plurality of quantization levels comprises determining that none of the plurality of quantization levels satisfies the threshold energy criterion, and wherein generating a scaled and quantized version of the set of coefficients based on the assessment of the plurality of quantization levels comprises, responsive to determining that none of the plurality of quantization levels satisfies the threshold energy criterion:
identifying a maximum scaled coefficient within the subset of the first set of scaled coefficients that are for spatial frequencies within the first band of spatial frequencies; and
determining a quantization level that is less than a value of the identified maximum scaled coefficient; and
using the determined quantization level to quantize the subset of the first set of scaled coefficients that are for spatial frequencies within the first band of spatial frequencies.

18. The article of manufacture of claim 15, wherein the operations further comprise:
determining the first set of scaling factors based on the block of pixels of the image;
wherein performing the assessment of the plurality of quantization levels comprises determining that none of the plurality of quantization levels satisfies the threshold energy criterion, and wherein generating a scaled and quantized version of the set of coefficients based on the assessment of the plurality of quantization levels comprises, responsive to determining that none of the plurality of quantization levels satisfies the threshold energy criterion:
determining a second set of scaling factors, wherein at least one scaling factor of the second set of scaling factors is lower in magnitude than a corresponding scaling factor of the first set of scaling factors;
using the second set of scaling factors, performing an assessment of the plurality of quantization levels; and
based on the assessment of the plurality of quantization levels using the second set of scaling factors, generating the scaled and quantized version of the set of coefficients.

19. The article of manufacture of claim 15, wherein performing the assessment of the plurality of quantization levels comprises determining that none of the plurality of quantization levels satisfies the threshold energy criterion, and wherein generating an encoded version of the image based on the scaled and quantized version of the set of coefficients comprises, responsive to determining that none of the plurality of quantization levels satisfies the threshold energy criterion, representing at least one of the coefficients within the subset of the first set of scaled coefficients that are for spatial frequencies within the first band of spatial frequencies with a symbol representing a sub-unity value.

20. The article of manufacture of claim 13, wherein the operations further comprise:
determining an energy of a first subset of the set of coefficients indicative of image contents, wherein the first subset of the set of coefficients indicative of image contents are indicative of respective spatial frequencies within the first band of spatial frequencies, and
wherein comparing the post-quantization energy to a threshold energy criterion comprises comparing a ratio between the post-quantization energy and the energy of the first subset of the set of coefficients to a threshold energy.

* * * * *